United States Patent [19]
Yasui et al.

[11] 4,259,395
[45] Mar. 31, 1981

[54] PROCESS FOR PREPARATION OF RESIN COMPOSITION USEFUL FOR LAMINATED SHEET

[75] Inventors: Seimei Yasui, Takarazuka; Yoshinobu Matsuda, Osaka; Masakazu Sagou, Osaka; Takanobu Noguchi, Osaka, all of Japan

[73] Assignee: Sumitomo Chemical Company, Limited, Osaka, Japan

[21] Appl. No.: 47,700

[22] Filed: Jun. 12, 1979

[30] Foreign Application Priority Data

Jun. 14, 1978 [JP] Japan .................................. 53-72438
Jun. 29, 1978 [JP] Japan .................................. 53-79384
Jan. 22, 1979 [JP] Japan .................................. 54-6423

[51] Int. Cl.$^3$ .............................................. C08G 8/04
[52] U.S. Cl. .................................... 428/248; 428/245; 428/249; 428/251; 428/271; 428/273; 428/298; 428/901; 525/134; 525/332; 525/384; 528/159; 528/205
[58] Field of Search ....................... 525/332, 384, 134; 528/205, 159; 428/248, 251, 264, 268, 271, 901, 249, 245, 273, 298

[56] References Cited
FOREIGN PATENT DOCUMENTS 47-43312 11/1972 Japan .
48-79895 10/1973 Japan .
50-109285 8/1975 Japan .

*Primary Examiner*—James J. Bell
*Attorney, Agent, or Firm*—Birch, Stewart, Kolasch & Birch

[57] ABSTRACT

Process for the preparation of a resin composition which comprises reacting a polybutadiene having a number average molecular weight of 150 to 10,000 and 1,4-structure of at least 80% by weight with a phenol in the presence of an acid catalyst to obtain a composition which consists of a polybutadiene-phenol adduct and unreacted phenol, in said polybutadiene-phenol adduct, one molecule of phenol per 3 to 8 butadiene units being added to the polybutadiene, and reacting the polybutadiene-phenol adduct composition with a formaldehyde in the presence of a basic catalyst. Said resin composition thus prepared is useful for the preparation of a laminated sheet having excellent curing characteristics, particularly excellent electrical characteristics, punchability and flexibility.

20 Claims, No Drawings

PROCESS FOR PREPARATION OF RESIN COMPOSITION USEFUL FOR LAMINATED SHEET

The present invention relates to a process for the preparation of a novel resin composition comprising a phenol resin modified with a liquid polybutadiene, which is useful as a bonding agent for laminated sheets. More particularly, it relates to a process for the preparation of a resin composition which comprises subjecting a phenol to an addition reaction with a liquid polybutadiene having 1,4-structure of at least 80% and a number average molecular weight of 150 to 10,000 and reacting the resulting resin with formaldehyde, said resin composition comprising a phenol resin modified with a liquid polybutadiene being useful as a bonding agent for laminated sheets, i.e. as a varnish for impregnating into base materials for laminated sheets because of its excellent solubility in an organic solvent. The laminated sheet prepared by using the novel resin composition of the present invention as a bonding agent has excellent machinability, chemical resistance, curing characteristics and has various properties similar to or greater than those of the conventional phenol resins modified with a drying oil, and further, the resin composition of the present invention can be prepared at a low cost.

Phenol resins have excellent properties, such as excellent water resistance, heat resistance and electrical characteristics, but are hard and brittle, and hence, they are not used alone but are usually used in combination with other ingredients.

Laminated sheets are usually prepared by impregnating an uncured phenol resin into a base material such as paper, cotton cloth, asbestos paper, asbestos cloth or glass fiber cloth, drying the base material, and piling up a few or some of the base material thus impregnated with an uncured phenol resin and then pressing with heating the thus piled base materials to form a sheet. The laminated sheets thus prepared are widely used as an electrical insulating material. Particularly, a phenolic paper laminated sheet having a thickness of 0.8 to 3.2 mm is widely used for electrical devices, and a copper-clad laminate is used for a printed-wiring board. The latter copper-clad laminates is usually required to have excellent punchability at a low temperature, because when wire terminals of parts such as an electrical resistance, diode or condensor are inserted into the punched holes thereof by an automatic insertion machine, an excellent dimension accuracy for punching is required. In order to give the laminate sheet an impact resistance, the laminate sheet is usually modified with a modifying agent such as a vegetable oil, an alkylphenol, or a polyether, by which flexibility is given to the laminate sheet. A representative example of the modifying agent is tung oil, but since it is a natural product and is expensive and further the cost is variable, it is very difficult to obtain in a stable cost and amount. Moreover, owing to the molecular structure of the tung oil, the laminated sheet modified with tung oil has inferior electrical characteristics.

Under the circumstances, it has been required to find a synthetic drying oil which is useful as a modifying agent instead of tung oil. Processes for the preparation of an adduct of a conjugated diolefinic polymer and a phenol are known and are described in various literatures, for example, in Japanese Patent Publication (unexamined) Nos. 20890/1973, 53628/1974, 61493/1975 and 39220/1972. Japanese Patent Publication (unexamined) No. 53628/1974 discloses also that the adduct is useful as a coating agent, but does not describe any use thereof for a laminated sheet. It is also known that a resol resin is prepared by reacting an adduct of a conjugated diolefinic polymer and a phenol with formalin. For instance, it is disclosed in Japanese Patent Publication (unexamined) No. 20890/1973 that a methylol group can be introduced into an adduct of a conjugated diolefinic polymer and a phenol by reacting it with formalin, but no working example is disclosed and any use thereof for a phenolic laminated sheet is not disclosed either. Japanese Patent Publication (unexamined) No. 79895/1973 and Japanese Patent Publication No. 43312/1972 disclose the reaction of a 1,2-type polybutadiene with a phenol, and followed by introduction of a methylol group thereto and that the methylol compound thus obtained can be used for the preparation of a phenolic laminated sheet. In these literatures, 1,2-polybutadiene is used, because when a polybutadiene having a 1,2-type bond of less than 20% is used, the amount of addition to phenol is small and hence the addition product has inferior properties. It has also been proposed in Japanese Patent Publication (unexamined) No. 109285/1975 to use a methylol phenol resin prepared by subjecting a phenol to an addition reaction with a polybutadiene containing about 40% of a vinyl group and then introducing thereto methylol groups.

However, when the polybutadiene containing 1,2-structure of more than 20%, particularly more than 50%, is added to a phenol, a ring-forming reaction at the double bonds occurs vigorously by the act of an acid catalyst in addition to the addition reaction with the phenol, and hence, the resin thus obtained shows a higher glass transition point and unfavorably loses its flexibility. The laminate sheet modified with tung oil usually has a good flexibility but, when the tung oil has 1,2-structure of more than 20%, the flexibility is unfavorably lost.

As a result of an intensive study by the present inventors on liquid polybutadienes for improving the characteristics of phenolic laminated sheets, such as flexibility and electrical characteristics, it has been found that a liquid polybutadiene having 1,4-structure of at least 80% can improve the characteristics of a phenolic laminated sheet, particularly the flexibility which is required in the processing thereof.

An object of the present invention is to provide a process for the preparation of a phenol resin modified with a liquid polybutadiene having a 1,4-structure of at least 80%. Another object of the invention is to provide an improved resin composition which has an excellent flexibility and is useful as a bonding agent for laminated sheets. A further object of the invention is to provide a laminated sheet having excellent flexibility, punchability, electrical characteristics, or the like. These and other objects of the invention will be apparent from the following description.

According to the present invention, a liquid polybutadiene having a 1,4-structure of at least 80% and a number average molecular weight of 150 to 10,000 is subjected to an addition reaction with a phenol in the presence of an acid catalyst to obtain a resin composition (A) comprising the addition product and unreacted phenol, and then reacting the composition (A) thus obtained with formaldehyde in the presence of a basic catalyst, the addition product of the liquid polybutadiene and the phenol contained in said composition (A)

having one molecule of the phenol per 3 to 8 butadiene monomer units.

The liquid polybutadiene used in the present invention has a 1,4-structure of at least 80% and a number average molecular weight of 150 to 10,000, preferably 600 to 2000, (measured by vapor pressure osmometry), and has preferably a viscosity of 50 to 5,000 cps at 20° C., more preferably 150 to 3,000 cps at 20° C., particularly 600 to 2,000 cps at 20° C., and an iodine value of 400 iodine/100 g or more. Such liquid polybutadienes can be prepared by conventional processes as disclosed in Japanese Patent Publication (unexamined) Nos. 43084/1973, 26396/1974 and 89788/1974.

The phenol used in the present invention includes, all monovalent or divalent phenols, such as phenol, cresol, xylenol, p-tert-butylphenol, resorcinol, nonylphenol, hydroquinone, catechol, saligenin, or the like, which may be used alone or a combination of two or more thereof.

The composition (A) comprising the addition product of the liquid polybutadiene and the phenol is preferably prepared in the manner that the liquid polybutadiene is wholly or portionwise added to a mixture of an acid catalyst and the phenol, said phenol being used in an amount of 10 to 1,000 parts by weight, preferably 50 to 300 parts by weight, per 100 parts of the liquid polybutadiene. When the amount of phenol is less than 10 parts by weight to 100 parts by weight of the liquid polybutadiene, the processing of a laminated sheet prepared by using the phenol resin modified with a liquid polybutadiene can not sufficiently be done because of the lower curing speed of the phenol resin modified with a liquid polybutadiene, and further, the laminated sheet thus obtained has an inferior chemical resistance. On the other hand, when the amount of phenol is more than 1,000 parts by weight to 100 parts by weight of the liquid polybutadiene, the laminated sheet has unfavorably an inferior punchability at room temperature.

The resin composition (A) contains preferably the addition product of a specific ratio of the liquid polybutadiene and the phenol, i.e. one molecule of the phenol per 3 to 8 units of the butadiene monomer composing the liquid polybutadiene. For instance, in case of a liquid polybutadiene having a number average molecular weight of 1,700 it is preferable to add 4 to 10 molecules of the phenol per one molecule of the liquid polybutadiene. When the addition molecular number of the phenol is less than one moleucle per 8 units of the butadiene monomer of the liquid polybutadiene, the resol product gives an uneven cured product consiting of two phases of uncured liquid polybutadiene-phenol adduct and solid phenol resin (which is produced by curing of the methylol phenol) or a wholly uncured rubber-like product by curing at 160° C. for 20 minutes. Accordingly, when a laminated sheet is produced by using such a resin composition, the curing speed is very low and hence the processing of the sheet is very difficult. On the other hand, when the addition molecular number of the phenol is over one molecule per 3 units of the butadiene monomer of the liquid polybutadiene, the composition (A) has a very high viscosity, which results in an inferior workability and less impregnating properties into the base material and also inferior punchability of the laminated sheet. The addition reaction can be stopped by a conventional method, for instance, by adding a Lewis base (e.g. an amine) to the reaction mixture.

The acid catalyst used in the addition reaction includes protonic acids and Lewis acids. Suitable examples of the protonic acids are mineral acids such as sulfuric acid, hydrochloric acid, or the like, sulfonic acids such as p-toluenesulfonic acid or the like, or a mixture thereof, and suitable examples of Lewis acids are various Lewis acids or a complex thereof, such as aluminum chloride, ferric chloride, boron trifluoride, boron trifluoride-phenol complex, or mixtures thereof. The amount of the acid catalyst is not critical, but it is usually used in an amount of 0.01 to 10 parts by weight per 100 parts by weight of the liquid polybutadiene.

The addition reaction of the liquid polybutadiene and the phenol may optionally be carried out in the presence of a solvent. The solvent has preferably a dielectric constant of not higher than 15, more preferably not higher than 10, at 25° C. Suitable examples of the solvent are hydrocarbons such as benzene, toluene, xylene, n-heptane, n-hexane or cyclohexane; halogenated hydrocarbons such as monochlorobenzene, or dichlorobenzene, or the like. The solvent is preferably used in an amount of 5 to 500 parts by weight, more preferably 10 to 100 parts by weight, per 100 parts by weight of the liquid polybutadiene.

The reaction temperature of the addition reaction is not critical, but is preferably in the range of 40° to 170° C.

The formaldehyde to be reacted with the composition (A) includes formalin and paraformaldehyde. The formaldehyde is used in an amount of 0.6 to 3.0 mole, preferably 0.6 to 2.0 mole, (in case of paraformaldehyde, it is converted into formaldehyde) per 1 mole of the phenol used for the preparation of the composition (A). When the formaldehyde is used in an amount of less than 0.6 mole, the methylol group-introducing reaction can not sufficiently be done, and hence, the laminated sheet prepared by using such a resin composition has inferior characteristics, i.e. inferior curing characteristics and inferior solvent resistance. On the other hand, when the solvent is used in an amount of more than 3.0 mole, the methylol group-introducing reaction proceeds too rapidly, and hence, the reaction is impracticable.

The basic catalyst to be used in the reaction of the formaldehyde and the composition (A), i.e. in the methylol group-introducing reaction includes ammonia; amines such as a dialkylamine having 1 to 20 carbon atoms in each alkyl moiety (e.g. dimethylamine, diethylamine, or dipropylamine), a trialkylamine having 1 to 20 carbon atoms in each alkyl moiety (e.g. trimethylamine, triethylamine), an alkylenediamine having 2 to 5 carbon atoms in the alkylene moiety (e.g. ethylenediamine, or propylenediamine), trimethylolamine, hexamethylenetetramine, or the like; and hydroxides such as alkali metal hydroxide or alkaline earth metal hydroxide (e.g. sodium hydroxide, potassium hydroxide, barium hydroxide). These basic compounds may be used alone or in a combination of two or more thereof.

The amount of the basic catalyst is not critical, but it is usually used in an amount of 0.001 to 0.5 mole, preferably 0.01 to 0.5 mole, per 1 mole of the phenol used for the preparation of the composition (A).

Other reaction conditions for the methylol group-introducing reaction are not critical, either, but the reaction is preferably carried out at a temperature of 60° to 120° C. for 30 to 300 minutes, more preferably for 60 to 180 minutes. The reaction product may be used as a varnish for the preparation of a laminated sheet as it is, or after being dehydrated under reduced pressure and then being diluted with an appropriate solvent.

The methylol group-introducing reaction is preferably carried out in an appropriate solvent. The solvent includes hydrocarbons, halogenated hydrocarbons, alcohols, ethers, ketones, esters, or the like. Suitable examples of the hydrocarbons are benzene, toluene, xylene, durene, hexane, heptane, pentane, octane, or the like. Among them, benzene, toluene and xylene are particularly preferable. Suitable examples of the halogenated hydrocarbons are monochlorobenzene, monobromobenzene, dichlorobenzene, dichloroethane, perchloroethylene, chlorohexane, chlorooctane, or the like. Alcohols are preferably alcohols having 1 to 27 carbon atoms, for example, saturated monovalent alcohols such as methyl alcohol, ethyl alcohol, n-propyl alcohol, isopropyl alcohol, n-butyl alcohol, isobutyl alcohol, secbutyl alcohol, tert-butyl alcohol, n-amyl alcohol, secamyl alcohol, 1-ethylpropyl alcohol, isoamyl alcohol, tertamyl alcohol, 2,2-dimethylpropyl alcohol, 1,2-dimethylpropyl alcohol, n-hexyl alcohol, 1,3-dimethyl-n-butyl alcohol, 1-methyl-n-hexyl alcohol, n-heptyl alcohol, 1-methyl-n-heptyl alcohol, n-octyl alcohol, capryl alcohol, 2-ethyl-n-hexyl alcohol, isooctyl alcohol, n-nonyl alcohol, n-decyl alcohol, n-undecyl alcohol, n-dodecyl alcohol, n-tridecyl alcohol, n-tetradecyl alcohol, n-pentadecyl alcohol, cetyl alcohol, stearyl alcohol, n-nonadecyl alcohol, behenyl alcohol, cyclohexanol, or the like; unsaturated monovalent alcohols such as allyl alcohol, propargyl alcohol, crotyl alcohol, oleyl alcohol, elaidyl alcohol, linoleyl alcohol, geraniol, or the like; aromatic alcohols such as benzyl alcohol, β-phenylethyl alcohol, hydrocinnamyl alcohol, or the like; ether alcohols such as ethylene glycol monomethyl ether, ethylene glycol monoethyl ether, ethylene glycol monoisopropyl ether, ethylene glycol monobutyl ether, diethylene glycol monomethyl ether, diethylene glycol monoethyl ether, triethylene glycol monomethyl ether, furfuryl alcohol, tetrahydrofurfuryl alcohol, or the like, which may be used alone or in a combination of two or more thereof. Although divalent alcohols such as ethylene glycol, diethylene glycol, propylene glycol, propanediol and butanediol may also be used, it is preferable to use an alcohol having a lower molecular weight because of ease of the removal thereof during the drying step of the varnish.

Suitable examples of ethers are dimethyl ether, diethyl ether, dipropyl ether, tetrahydrofuran, or the like. Suitable examples of ketones are acetone, diethyl ketone, dipropyl ketone, cyclohexanone, or the like. Suitable examples of esters are ethyl formate, ethyl acetate, isoamyl acetate, ethyl butyrate, or the like.

A particularly preferred solvent is a mixture of 1 part by weight of a hydrocarbon as mentioned above and 0 to 100 parts by weight, more preferably 0 to 5 parts by weight, of an alcohol as mentioned above.

The amount of the solvent is not critical, but it is usually used in an amount of 1 to 2,000 parts by weight, preferably 20 to 500 parts by weight, per 100 parts by weight of the composition (A).

The present resin composition comprising a phenol resin modified with a liquid polybutadiene can be used for the production of laminated sheets by conventional methods. For example, the resin composition is firstly dissolved in an appropriate solvent to obtain a varnish, and the varnish thus prepared is impregnated into a base material and then dried to obtain a prepreg. Alternatively, the prepreg may be obtained by previously impregnating a prescribed amount of a water-soluble phenol resin and/or a phenol resin modified with an amine into a base material, drying the base material, and thereafter impregnating a prescribed amount of the resin composition of the present invention into the base material thus obtained followed by drying. A necessary number of prepreg thus prepared are piled up and pressed with heating to give the desired laminated sheet.

The solvent used for the preparation of a varnish includes the same solvents as used in the methylol groupintroducing reaction as mentioned above, such as hydrocarbons, alcohols, ethers, ketones, and esters. Among them, toluene, methanol and acetone are preferably from the practical and economical viewpoints.

The base material used for the laminated sheet includes paper, cotton cloth, asbestos paper, asbestos cloth, glass fiber cloth, or the like. The base material is preferably subjected to the conventional surface treatment in order to improve the adhesion with the phenol resin modified with a liquid polybutadiene. For example, the glass fiber cloth containing no alkali is previously treated with silane or boran. When a plurality of the prepregs are piled up and a copper foil is placed thereon and then the resulting piled product is heat-pressed, there can be obtained a copper-clad laminate.

The present invention is illustrated by the following Examples, but is not limited thereto.

EXAMPLE 1

A mixture of phenol (150 g), toluene (50 g) and boron trifluoride-phenol complex (0.5 g) was heated at 70°–75° C. and thereto was added dropwise liquid polybutadiene (100 g), which had a viscosity of 660 cps at 20° C., a number average molecular weight of 1700 (measured by a vapor pressure osmometer), cis-1,4 structure of 74%, trans-1,4 structure of 24% and vinyl structure of 2%, over a period of 20 minutes, and the mixture was reacted with agitation at 80° C. for 2 hours. The reaction mixture was admixed with triethylamine (1.0 g) to obtain a resin composition ($A_1$).

It was analytically confirmed that the resin composition ($A_1$) was a mixture of a liquid polybutadiene-phenol adduct and unreacted phenol, in said adduct, 7.5 molecules of phenol in average being added to one molecule of the liquid polybutadiene (i.e. one molecule of phenol per 4.2 butadiene units).

To the resin composition ($A_1$) (100 g) were added paraformaldehyde (20.8 g), hexamethylenetetramine (1.5 g), toluene (68 g) and isopropyl alcohol (32 g), and the mixture was reacted with agitation at 80°–83° C. for 2 hours in a reactor. After the reaction, the reaction mixture was concentrated under reduced pressure. The concentrated mixture was dissolved in a mixed solvent of toluene-methanol (3:1 by weight) to give a homogeneous, transparent varnish of phenol resin modified with liquid polybutadiene which contained 50% by weight of resin component.

A cotton linter paper was previously undercoated with a water-soluble phenol formaldehyde varnish and was impregnated with the varnish obtained above and dried to give a resin-impregnated base material (impregnated resin content: 45% by weight).

A fixed number of the base material thus obtained was piled up and heat-pressed at 160° C. under a pressure of 80-100 kg/cm$^2$ for 50 minutes to give a laminated sheet having a thickness of 1.6 mm.

EXAMPLE 2

To the same resin composition ($A_1$) (100 g) as obtained in Example 1 were added paraformaldehyde (20.8 g), hexamethylenetetramine (3.0 g), toluene (52 g) and isopropanol (48 g). The mixture was reacted with agitation at 80°-83° C. for 2 hours in a reactor. After the reaction, the reaction mixture was concentrated under reduced pressure, and the concentrated mixture was dissolved in a mixed solvent of toluene-methanol (3:1 by weight) to give a homogeneous, transparent varnish of phenol resin modified with liquid polybutadiene which contained 50% by weight of resin component. By using the varnish thus obtained, a laminated sheet having a thickness of 1.6 mm was prepared in the same manner as described in Example 1.

The properties of the varnishes and laminated sheets obtained in Examples 1 and 2 are shown in the following Table 1.

TABLE 1

| Properties | Example 1 | Example 2 |
| --- | --- | --- |
| Appearance when the varnish was cured at 160° C. for 20 minutes | Uniform, transparent | Uniform, transparent |
| Gelling time of the varnish, i.e. time till the varnish was gelled when heated on a hot plate at 150° C. | 6 minutes | 7 minutes |
| Punchability of the laminated sheet at room temperature (ASTM D 617-70) | Very good | Very good |
| Solvent resistance of the laminated sheet (the appearance was observed when immersed in boiling trichlene for 10 minutes) | Not changed | Not changed |

EXAMPLE 3

Liquid polybutadiene (100 g) (Sumikaoil® #150, a tradename of Sumitomo Chemical Company, Limited), which had a viscosity of 660 cps at 20° C., a number average molecular weight of 1700 (mesured by a vapor pressure osmometer), cis1,4 structure of 74%, trans-1,4 structure of 24% and vinyl structure of 2%, was mixed with phenol (150 g) and p-toluenesulfonic acid (1.25 g). The mixture was reacted with agitation at 100° C. for 2 hours, and thereto was added triethylamine (1.0 g) to obtain a resin composition ($A_2$).

The resin composition ($A_2$) was a mixture of a liquid polybutadiene-phenol adduct and unreacted phenol, in said adduct, 7.5 molecules of phenol in average being added to one molecule of the liquid polybutadiene (i.e. one molecule of phenol per 4.2 butadiene units), which was confirmed by a gas chromatography.

To the resin composition ($A_2$) (100 g) were added paraformaldehyde (20.8 g), hexamethylenetetramine (1.5 g), toluene (60 g) and isopropyl alcohol (20 g), and the mixture was reacted with agitation at 80°-83° C. for 2 hours in a reactor. After reaction, the reaction mixture was concentrated under reduced pressure, and the concentrated mixture was dissolved in a mixed solvent of toluene-isopropyl alcohol (4:1 by weight) to obtain a homogeneous, transparent varnish of phenol resin modified with liquid polybutadiene which contained 50% by weight of resin component.

A cotton linter paper, which was previously undercoated with a water-soluble phenol-formaldehyde varnish, was impregnated with the varnish obtained above and dried to give a resin-impregnated base material (impregnated resin content: 52% by weight).

A fixed number of the base material thus obtained was piled up and heat-pressed at 160° C. under a pressure of 80-100 kg/cm² for 50 minutes to give a laminated sheet having a thickness of 1.6 mm.

EXAMPLE 4

The same liquid polybutadiene (100 g) as used in Example 3 was mixed with phenol (150 g) and p-toluenesulfonic acid (0.75 g), and the mixture was reacted with agitation at 100° C. for 2 hours, and to the reaction mixture was added triethylamine (0.6 g) to give a resin composition ($A_3$).

It was confirmed by the same analysis as in Example 3 that in the liquid polybutadiene-phenol adduct contained in this resin composition ($A_3$), 6.0 molecules of phenol were added to one molecule of the liquid polybutadiene (i.e. one molecule of phenol per 5.3 butadiene units).

The resin composition ($A_3$) was reacted with formaldehyde in the same manner as described in Example 3, and the reaction mixture was concentrated under reduced pressure, and the concentrated mixture was dissolved in a mixed solvent of toluene-isopropanol (4:1 by weight) to give a homogeneous, transparent varnish of phenol resin modified with liquid polybutadiene which contained 50% by weight of resin component.

A cotton linter paper, which was previously undercoated with a water-soluble phenol formaldehyde varnish, was impregnated with the varnish obtained above and dried to give a resin-impregnated base material (impregnated resin content: 47% by weight).

A fixed number of the base material were piled up and heat-pressed at 160° C. under a pressure of 80-100 kg/cm² for 50 minutes to give a laminated sheet having a thickness of 1.6 mm.

EXAMPLE 5

The same liquid polybutadiene (100 g) as used in Example 3 was mixed with phenol (150 g), p-toluenesulfonic acid (1.5 g) and toluene (b 50 g), and the mixture was reacted with agitation at 100° C. for 4 hours, and to the reaction mixture was added triethylamine (1.3 g) to give a resin composition ($A_4$).

It was confirmed by the same analysis as in Example 3 that in the liquid polybutadiene-phenol adduct contained in the resin composition ($A_4$), 8.0 molecules of phenol were added to one molecule of the liquid polybutadiene (i.e. one molecule of phenol per 3.9 butadiene units).

To the resin composition ($A_4$) (100 g) were added paraformaldehyde (20.8 g), hexamethylenetetramine (1.5 g), toluene (43 g) and isopropyl alcohol (20 g), and the mixture was reacted with agitation at 80°-83° C. for 2 hours in a reactor. After the reaction, the reaction mixture was concentrated under reduced pressure and the concentrated mixture was dissolved in a mixed solvent of toluene-isopropyl alcohol (4:1 by weight) to give a homogeneous, transparentvarnish of phenol resin modified with liquid polybutadiene which contained 50% by weight of resin component.

A cotton linter paper, which was previously undercoated with a water-soluble phenol formaldehyde varnish, was impregnated with the varnish obtained above and dried to give a resin-impregnated base material (impregnated resin content: 48% by weight).

A fixed number of the base material were piled up and heat-pressed at 160° C. under a pressure of 80–100 kg/cm² for 50 minutes to give a laminated sheet having a thickness of 1.6 mm.

REFERENCE EXAMPLE 1

A liquid polybutadiene (100 g) (Nisso ® PB-B-1000, a tradename of Nippon Soda Co., Ltd.), which had a viscosity of 7400 cps at 20° C., a number average molecular weight of 1200 (measured by a vapor pressure osmometer), 1,2-vinyl structure of more than 85% and 1,4-trans structure of less than 15% was mixed with phenol (150 g), p-toluenesulfonic acid (1.5 g), and toluene (50 g). The mixture was reacted with agitation at 100° C. for 4 hours, and thereto was added triethylamine (1.3 g) to give a resin composition ($A_5$).

It was confirmed by the same analysis as in Example 3 that in the liquid polybutadiene-phenol adduct contained in the resin composition ($A_5$), 5.0 molecules of phenol in average were added to one molecule of liquid polybutadiene (i.e. one molecule of phenol per 4.4 butadiene units).

By using the resin composition ($A_5$), a laminated sheet was prepared in the same manner as described in Example 3.

REFERENCE EXAMPLE 2

The same liquid polybutadiene (100 g) as used in Example 3 was mixed with phenol (150 g) and p-toluenesulfonic acid (1.25 g), and the mixture was reacted with agitation at 100° C. for 40 minutes, and thereto was added triethylamine (1.0 g) to give a resin composition ($A_6$).

It was confirmed by the same analysis as in Example 3 that in the liquid polybutadiene-phenol adduct contained in the resin composition ($A_6$), 2.1 molecules of phenol were added to one molecule of liquid polybutadiene (i.e. one molecule of phenol per 15 butadiene units).

By using the resin composition ($A_6$) thus obtained, a laminated sheet was prepared in the same manner as described in Example 3.

REFERENCE EXAMPLE 3

The same liquid polybutadiene (100 g) as used in Example 3 was mixed with phenol (200 g) and p-toluenesulfonic acid (1.25 g), and the mixture was reacted with agitation at 100° C. for 8 hours, and thereto was added triethylamine (1.0 g) to give a resin composition ($A_7$).

It was confirmed by the same analysis as in Example 3 that in the liquid polybutadiene-phenol adduct contained in the resin composition ($A_7$), 11 molecules of phenol were added to one molecule of liquid polybutadiene (i.e. one molecule of phenol per 2.8 butadiene units).

By using the resin composition ($A_7$), a laminated sheet was prepared in the same manner as described in Example 3.

The properties of the varnishes and laminated sheets obtained in the above Examples 3 to 5 and Reference Examples 1 to 3 are shown in Table 2.

TABLE 2

| Properties | Example 3 | Example 4 | Example 5 | Reference Example 1 | Reference Example 2 | Reference Example 3 |
|---|---|---|---|---|---|---|
| Appearance when the varnish was cured at 160° C. for 20 minutes | Uniformly cured | Uniformly cured | Uniformly cured | Uniformly cured | Unevenly cured (non-cured portions were observed) | Uniformly cured |
| Gelling time of the varnish, i.e. time till the varnish was gelled when heated on a hot plate at 150° C. | 6 min. | 8 min. | 6 min. | longer than 15 min. | longer than 20 min. | 4 min. |
| Appearance of the laminated sheet | Very good | Very good | Very good | Very good | Surface was tacky | Uneven due to inferior impregnation |
| Solvent resistance of the laminated sheet (appearance was observed when immersed in boiling trichlene for 10 minutes) | Not changed | Not changed | Not changed | Not changed | Blushing | Blistering |
| Punchability of the laminated sheet at room temperature (ASTM D 617-70) | Very good | Very good | Very good | Cracking was observed at punched edges | Very good | Cracking was observed at punched edges |

EXAMPLE 6

A mixture of phenol (150 g), toluene (50 g) and boron trifluoride-phenol complex (0.5 g) was heated at 70°–75° C. and thereto was added dropwise a liquid polybutadiene (100 g) having a viscosity of 290 cps at 20° C., a number average molecular weight of 1230 (measured by a vapor pressure osmometer), cis-1,4 structure of 71%, trans-1,4 structure of 26% and vinyl structure of 3% over a period of 20 minutes, and the mixture was reacted with agitation at 80° C. for 2 hours, and thereafter, triethylamine (1.0 g) was added to the reaction mixture to give a resin composition ($A_8$).

It was analytically confirmed that the resin composition ($A_8$) was a mixture of a liquid polybutadiene-phenol adduct and unreacted phenol, and in the adduct, 5.5 molecules of phenol in average being added to one molecule of liquid polybutadiene.

The resin composition ($A_8$) (100 g) was mixed with paraformaldehyde (16.0 g), hexamethylenetetramine (3.0 g), toluene (64 g) and isopropyl alcohol (16 g), and the mixture was reacted with agitation at 80°–83° C. for 2 hours in a reactor. After the reaction, the reaction mixture was concentrated under reduced pressure and the concentrated mixture was dissolved in a mixed solvent of toluene-methanol (3:1 by weight) to give a homogeneous, transparent varnish of a phenol resin modified with a liquid polybutadiene which contained 50% by weight of resin component.

A glass fiber cloth was impregnated with a 1% aqueous solution of a hydrolyzed product of γ-aminopropyl-ethoxysilane and dried. The glass fiber cloth thus treated was impregnated with the varnish obtained above and dried to give a resin-impregnated base material (impregnated resin content: 55% by weight).

A fixed number of the base material thus obtained were piled up and on one side thereof was piled a copper foil with adhesive, and the resulting piled product was heat-pressed at 160° C. under a pressure of 80–100 kg/cm$^2$ for 50 minutes to give a copper-clad laminate having a thickness of 1.6 mm.

REFERENCE EXAMPLE 4

A mixture of phenol (150 g) and p-toluenesulfonic acid (0.150 g) was heated at 70°–75° C. and thereto was added dropwise Chinese tung oil (100 g) having a viscosity of 280 cps at 20° C. and a number average molecular weight of 870 (measured by a vapor pressure osmometer) over a period of 20 minutes, and the mixture was reacted with agitation at 80° C. for 2 hours, and thereto was added triethylamine (1.0 g) to give a composition (A$_9$).

It was analytically confirmed that the composition (A$_9$) was a mixture of a tung oil-phenol adduct, and in the adduct, 3.2 molecules of phenol in average being added to one molecule of chinese tung oil.

The composition (A$_9$) (100 g) was mixed with formalin (65.0 g) and a 28% aqueous ammonia (4.0 g), and the mixture was reacted with agitation at 80°–83° C. for 2 hours in a reactor. After the reaction, the reaction mixture was concentrated under reduced pressure and the concentrated mixture was dissolved in a mixed solvent of toluene-methanol (1:1 by weight) to give a homogeneous, transparent varnish of a phenol resin modified with tung oil.

By using the varnish thus obtained, a copper-clad laminate was prepared in the same manner as described in Example 6.

The properties of the copper-clad laminates obtained in Example 6 and Reference Example 4 were measured. The results are shown in Table 3.

TABLE 3

| Properties | | Example 6 | Reference Example 4 |
|---|---|---|---|
| Dielectric dissipation factor (1 MHZ) | C-90/20/65 | 0.020 | 0.035 |
| | C-90/20/65 + D-48/50 | 0.033 | 0.047 |
| Dielectric constant (1 MHZ) | C-90/20/65 | 4.50 | 4.97 |
| | C-90/20/65 + D-48/50 | 4.60 | 4.98 |
| Water absorption | E-24/50 + D-24/23 | 0.10% | 0.30% |
| Trichlene resistance | Boiled for 5 minutes | Not changed | Not changed |
| Punchability (at 80° C.) | ASTM D-617-70 | Very good | Very good |

What is claimed is:

1. A process for the preparation of a resin composition, which comprises reacting 100 parts by weight of a polybutadiene having a number average molecular weight of 150 to 10,000 and 1,4-structure of at least 80% by weight with 10 to 1,000 parts by weight of a phenol in the presence of 0.01 to 10 parts by weight of an acid catalyst at a temperature of 40° to 170° C. to obtain a composition of a polybutadiene-phenol adduct wherein one molecule of phenol per 3 to 8 butadiene units is added to the polybutadiene, and reacting the polybutadiene-phenol adduct composition with a formaldehyde in the amount of 0.6 to 3.0 moles per 1 mole of the phenol used for the preparation of the polybutadiene-phenol adduct composition in the presence of a basic catalyst.

2. A process according to claim 1, wherein the amount of the phenol is in the range of 50 to 500 parts by weight per 100 parts by weight of the polybutadiene.

3. A process according to any one of claims 1 or 2, wherein the polybutadiene has a number average molecular weight of 600 to 2,000.

4. A process according to any one of claims 1 or 2, wherein the reaction of a polybutadiene and a phenol is carried out by adding the polybutadiene to a mixture of a phenol and an acid catalyst.

5. A process according to claim 1, wherein the acid catalyst is a member selected from the group consisting of sulfuric acid, hydrochloric acid, p-toluenesulfonic acid, aluminum chloride, ferric chloride, boron trifluoride, and boron trifluoride-phenol complex.

6. A process according to claim 1, wherein the phenol is a member selected from the group consisting of phenol, cresol, xylenol, p-tert-butylphenol, resorcinol, nonylphenol, hydroquinone, catechol, and saligenin.

7. A process according to claims 1 or 2, wherein the reaction of a polybutadiene and a phenol is carried out in a solvent selected from the group consisting of a hydrocarbon and a halogenated hydrocarbon, which has a dielectric constant of not higher than 15 at 25° C.

8. A process according to claim 7, wherein the solvent is used in an amount of 5 to 500 parts by weight per 100 parts by weight of the polybutadiene.

9. A process according to claim 8, wherein the amount of the solvent is in the range of 10 to 100 parts by weight per 100 parts by weight of the polybutadiene.

10. A process according to claim 1, wherein the amount of formaldehyde is in the range of 0.6 to 2.0 moles per 1 mole of the phenol used for the preparation of the polybutadiene-phenol adduct composition.

11. A process according to claim 1, wherein the basic catalyst is a member selected from the group consisting of an amine, ammonia and a metal hydroxide.

12. A process according to claim 11, wherein the basic catalyst is a member selected from the group consisting of ammonia, hexamethylenetetramine, trimethylolamine, ethylenediamine, dimethylamine, diethylamine, triethylamine, sodium hydroxide, potassium hydroxide and barium hydroxide.

13. A process according to claim 1, wherein the basic catalyst is used in an amount of 0.001 to 0.5 mole per 1 mole of the phenol used for the preparation of the polybutadiene-phenol adduct composition.

14. A process according to claim 13, wherein the amount of the basic catalyst is in the range of 0.01 to 0.5 mole per 1 mole of the phenol used for the preparation of the polybutadiene-phenol adduct composition.

15. A process according to any one of claims 10 to 14, wherein the reaction of the polybutadiene-phenol adduct composition and a formaldehyde is carried out in a solvent selected from the group consisting of a hydrocarbon, a halogenated hydrocarbon, an alcohol, an ether, a ketone and an ester.

16. A process according to claim 15, wherein the solvent consists of one part by weight of a hydrocarbon and 0 to 100 parts by weight of an alcohol.

17. A resin composition prepared by the process of claim 1.

18. A laminate sheet which is prepared by impregnating the resin composition of claim 17 into a base material to give a prepreg, drying the prepreg, piling up a plurality of the prepregs thus obtained and then heat-pressing the resulting piled product.

19. A laminate sheet according to claim 18, wherein the base material is a member selected from the group consisting of a paper, a cotton cloth, an asbestos paper, an asbestos cloth, and a glass fiber cloth.

20. A laminate sheet according to claim 18, wherein a copper foil is placed on the piled prepreg before subjecting it to heat-pressing.

* * * * *